(12) United States Patent
Brestel et al.

(10) Patent No.: US 7,955,021 B2
(45) Date of Patent: Jun. 7, 2011

(54) COLLETS FOR USE WITH VALVES

(75) Inventors: Ronald Ray Brestel, Marshalltown, IA (US); Benjamin Uriah Good, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 145 days.

(21) Appl. No.: 12/262,983

(22) Filed: Oct. 31, 2008

(65) Prior Publication Data

US 2010/0109254 A1 May 6, 2010

(51) Int. Cl.
*F16K 31/00* (2006.01)
(52) U.S. Cl. .................. 403/371; 251/292; 251/304
(58) Field of Classification Search .......... 403/369, 403/371, 374.2; 251/292, 304; 137/250
See application file for complete search history.

(56) References Cited

U.S. PATENT DOCUMENTS

| | | | | |
|---|---|---|---|---|
| 172,689 | A * | 1/1876 | Barrett | 279/59 |
| 1,521,202 | A | 12/1924 | Osgood | |
| 1,857,012 | A * | 5/1932 | Corley | 279/56 |
| 2,888,282 | A * | 5/1959 | Naimer | 403/357 |
| 3,141,678 | A * | 7/1964 | Garrison | 279/114 |
| 3,190,609 | A | 6/1965 | Kintigh | |
| 3,839,882 | A * | 10/1974 | Gilarski, Jr. | 73/519.01 |
| 4,282,419 | A * | 8/1981 | Auer | 219/137.44 |
| 4,909,095 | A | 3/1990 | Carlson | |
| 4,940,249 | A * | 7/1990 | Drbal | 279/43.2 |
| 5,100,420 | A | 3/1992 | Green et al. | |
| 5,176,464 | A | 1/1993 | Tanner | |
| 5,197,738 | A | 3/1993 | Hartman, Sr. | |
| 5,744,773 | A | 4/1998 | Van Otteren et al. | |
| 5,823,499 | A * | 10/1998 | Ito et al. | 248/429 |
| 5,975,106 | A | 11/1999 | Morgan et al. | |
| 6,461,084 | B1 * | 10/2002 | Stuart | 405/244 |
| 6,666,129 | B1 | 12/2003 | Schmid et al. | |

(Continued)

FOREIGN PATENT DOCUMENTS

DE 3827428 2/1990

(Continued)

OTHER PUBLICATIONS

International Searching Authority, "International Search Report," issued in connection with corresponding international application serial No. PCT/US2009/057876, mailed Dec. 22, 2009, 4 pages.

(Continued)

*Primary Examiner* — Joshua T Kennedy
(74) *Attorney, Agent, or Firm* — Hanley, Flight & Zimmerman, LLC

(57) ABSTRACT

Collets for coupling rotary actuators to valves are disclosed. An example shaft coupling assembly includes an elongated member having a first end and a second end, in which the first end includes a coupling portion having a first opening configured to receive a rectangular shaft. The coupling portion includes at least one flexible member having an arcuate outer surface and a first inner surface adjacent a second inner surface that at least partially define the first opening. At least a portion of the first inner surface is to engage a first side of the rectangular shaft and at least a portion of the second inner surface is to engage a second side of the rectangular shaft. The shaft coupling assembly further includes a sleeve having a second opening to receive the elongated member and a tapered third opening configured to receive the coupling portion.

20 Claims, 6 Drawing Sheets

U.S. PATENT DOCUMENTS

| | | | |
|---|---|---|---|
| 6,742,786 B2 * | 6/2004 | Casel et al. | 279/56 |
| 6,857,448 B2 * | 2/2005 | Schwartzman | 137/625.18 |
| 2003/0014854 A1 | 1/2003 | Brown | |
| 2003/0084556 A1 | 5/2003 | Dunlop | |
| 2005/0274416 A1 * | 12/2005 | Engle et al. | 137/247 |
| 2008/0048403 A1 * | 2/2008 | Oldberding et al. | 279/2.01 |
| 2009/0304443 A1 * | 12/2009 | Moore | 403/409.1 |

FOREIGN PATENT DOCUMENTS

| | | |
|---|---|---|
| DE | 3927396 | 10/1990 |
| EP | 0524589 | 1/1993 |
| GB | 2327463 | 1/1999 |
| GB | 2327464 | 1/1999 |

OTHER PUBLICATIONS

International Searching Authority, "Written Opinion of the International Searching Authority," issued in connection with corresponding international application serial No. PCT/US2009/057876, mailed Dec. 22, 2009, 6 pages.

International Searching Authority, "International Search Report," issued in connection with international application serial No. PCT/US2009/057870, mailed Dec. 22, 2009, 4 pages.

International Searching Authority, "Written Opinion of the International Searching Authority," issued in connection with international application serial No. PCT/US2008/057870, mailed Dec. 22, 2009, 5 pages.

International Searching Authority, "International Search Report," issued in connection with international application serial No. PCT/US2009/057873, mailed Dec. 22, 2009, 4 pages.

International Searching Authority, "Written Opinion of the International Searching Authority," issued in connection with international application serial No. PCT/US2008/057873, mailed Dec. 22, 2009, 5 pages.

* cited by examiner

COLLETS FOR USE WITH VALVES

FIELD OF THE DISCLOSURE

The present disclosure relates generally to control valves and, more particularly, to collets for use with valves.

BACKGROUND

Fluid process systems typically use valves such as, for example, rotary valves to control the flow of process fluids. In general, rotary valves typically include a fluid flow control member disposed in a fluid path and rotatably coupled to the body of the rotary valve via a shaft. Typically, a portion of the shaft extending from the rotary valve is operatively coupled to an actuator (e.g., a pneumatic actuator, an electric actuator, a hydraulic actuator, etc.), which operates the flow control member. To couple the actuator to the valve shaft, a lever or lever arm is typically employed. The lever converts a linear displacement of an actuator stem into a rotational displacement of the valve shaft. Thus, rotation of the lever causes the valve shaft and the flow control member (e.g., a disk, a ball, etc.) to rotate to increase or restrict the flow of fluid through the valve. In operation, a controller may be used to control the displacement of the actuator to rotate the lever and the valve shaft and, thus, the flow control member of the valve to a desired angular position to achieve a desired fluid flow through the rotary valve.

However, shaft couplings such as, for example, levers that convert linear translation into rotational movement of a valve shaft are often prone to backlash. Backlash, which occurs if the lever is not properly sized to the shaft, results from clearance between contacting surfaces of the lever and the shaft. Backlash results in lost motion and reduced accuracy of fluid flow control through the valve. Additionally, Industry standards (e.g., International Organization for Standardization) may require an actuator to couple to differently sized valve shafts. Adherence to the ISO standard requires that actuators and valves made by multiple or different manufacturers can be interchangeably coupled to each other without requiring modification of the actuators or the valves. To substantially reduce backlash from inaccurately sized couplings and to facilitate the compatibility of control valves with a variety of actuators, many available actuators have shaft couplings such as, for example, a lever adapted with a collet to receive a valve shaft. In particular, many off-the-shelf actuators provide collets having a square bore or opening to receive differently sized square valve shafts.

To prevent lost motion from occurring between the lever and the square valve shaft, the collet must provide sufficient clamping force to the square end of the valve shaft. Failure to provide a sufficient clamping force between the collet and the valve shaft typically results in a loose mechanical coupling and, thus, lost motion between the lever and the valve shaft. Such lost motion may lead to inaccurate positioning of the flow control member and, thus, poor control over the fluid flowing through the valve.

SUMMARY

In one example, a shaft coupling assembly for use with rotary valves includes an elongated member having a first end and a second end, in which the first end includes a coupling portion having a first opening configured to receive a rectangular shaft. The coupling portion includes at least one flexible member having an arcuate outer surface and a first inner surface adjacent a second inner surface that at least partially define the first opening. At least a portion of the first inner surface is to engage a first side of the rectangular shaft and at least a portion of the second inner surface is to engage a second side of the rectangular shaft. The shaft coupling assembly further includes a sleeve having a second opening to receive the elongated member and a tapered third opening configured to receive the coupling portion.

In another example, a collet for use with a rectangular shaft includes a plurality of flexible members configured to be coupled to an elongated member and having a substantially rectangular bore to receive a rectangular shaft. The flexible members have seating surfaces that at least partially define the rectangular bore and arcuate outer surfaces that engage an inner surface of an opening of a lever. At least one seating surface of a first flexible member of the plurality of flexible members is to receive a first side and a second side of the rectangular shaft.

In yet another example, a collet includes a coupling portion coupled to an elongated member and having outer surfaces defining a rectangular cross-sectional shape having rounded corners and a first opening configured to receive a rectangular shaft. The coupling portion comprises a plurality of flexible members, each having a first inner surface adjacent a second inner surface that at least partially define the first opening, and an arcuate outer surface that at least partially defines the rounded corners of the coupling portion.

DETAILED DESCRIPTION

Figure 1A:
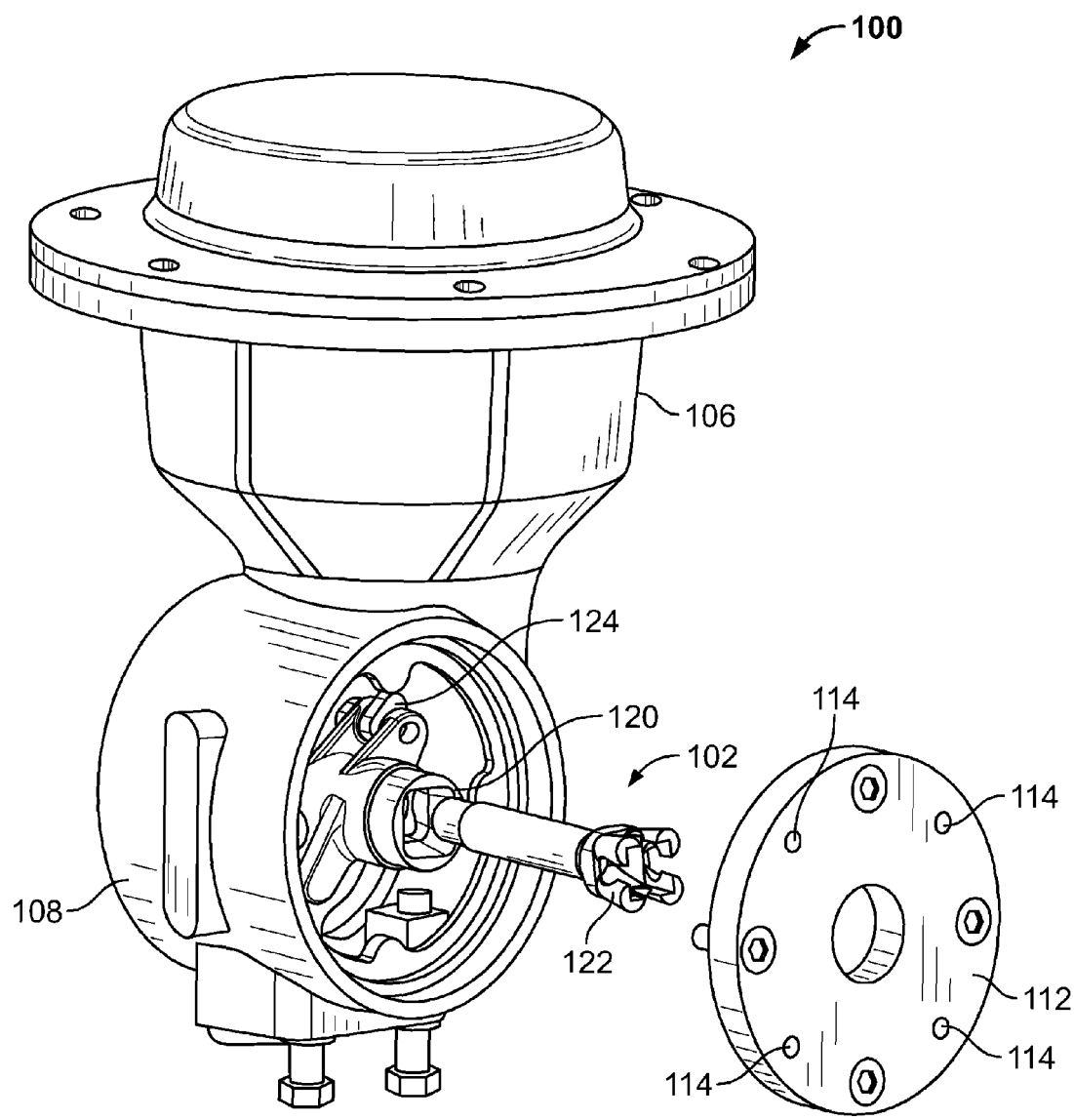
FIG. 1A illustrates an example rotary control valve assembly having an example collet and lever described herein.

The example collets disclosed herein may be used to couple differently sized, substantially square or rectangular valve shafts to control valve actuators. As used herein, the term substantially rectangular includes substantially square geometries. In contrast to known coupling techniques, the example collets described herein are configured to provide a substantially tight coupling between a lever and a substantially rectangular (e.g., square) shaft without requiring the use of wedges, shaft keys, or the like. In operation, the example collets described herein substantially eliminate lost motion between actuators and closure members (e.g., a valve plug). In addition, the example collets described herein may facilitate the coupling and de-coupling of actuators and valve shafts for purposes of, for example, installation processes, repair processes, etc.

As described in greater detail below, an example collet may include an elongated member coupled to a coupling portion having a substantially rectangular opening configured to receive a rectangular shaft. In particular, the coupling portion includes at least one flexible member (e.g., a tang, finger-like projection, etc.) that has a first inner surface adjacent a second inner surface that define at least a portion of the rectangular opening. The first inner surface and the second inner surface form an angle (e.g., a 270 degree angle) and define a seating surface that receives a corner surface of the rectangular shaft. The flexible member also includes an arcuate or cylindrically-shaped outer surface that is tapered and configured to engage a tapered inner surface of a coupling component such as, for example, a lever or a sleeve. In one example, the flexible member has a tapered cylindrically-shaped outer surface and a circular-sector cross-sectional shape. The flexible member may be displaced toward an axis of the elongated member by the coupling component. In general, any number of flexible members may be used to implement the example collets described herein.

The example collets described herein advantageously enable the flexible members to apply or concentrate a clamping force to the corner surfaces of the square end of a valve shaft. Applying such clamping force to these corner surfaces enables substantially improved coupling or torque transmission between a collet and a valve shaft to which the collet is coupled. Specifically, in the examples described herein, the centers (i.e., centers of curvature) of the arcuate outer surfaces lie inside respective corners of the rectangular shaft. Additionally, the arcuate or cylindrically-shaped tapered outer surfaces of the example flexible members described herein engage an inner surface of the coupling component (e.g., a lever) to provide a substantially tight fit or connection between the coupling component and the collet to further prevent or minimize lost motion between the coupling component and the collet and, thus, lost motion between the actuator and flow control member of the valve associated with the coupling component and the collet.

Figure 1B:
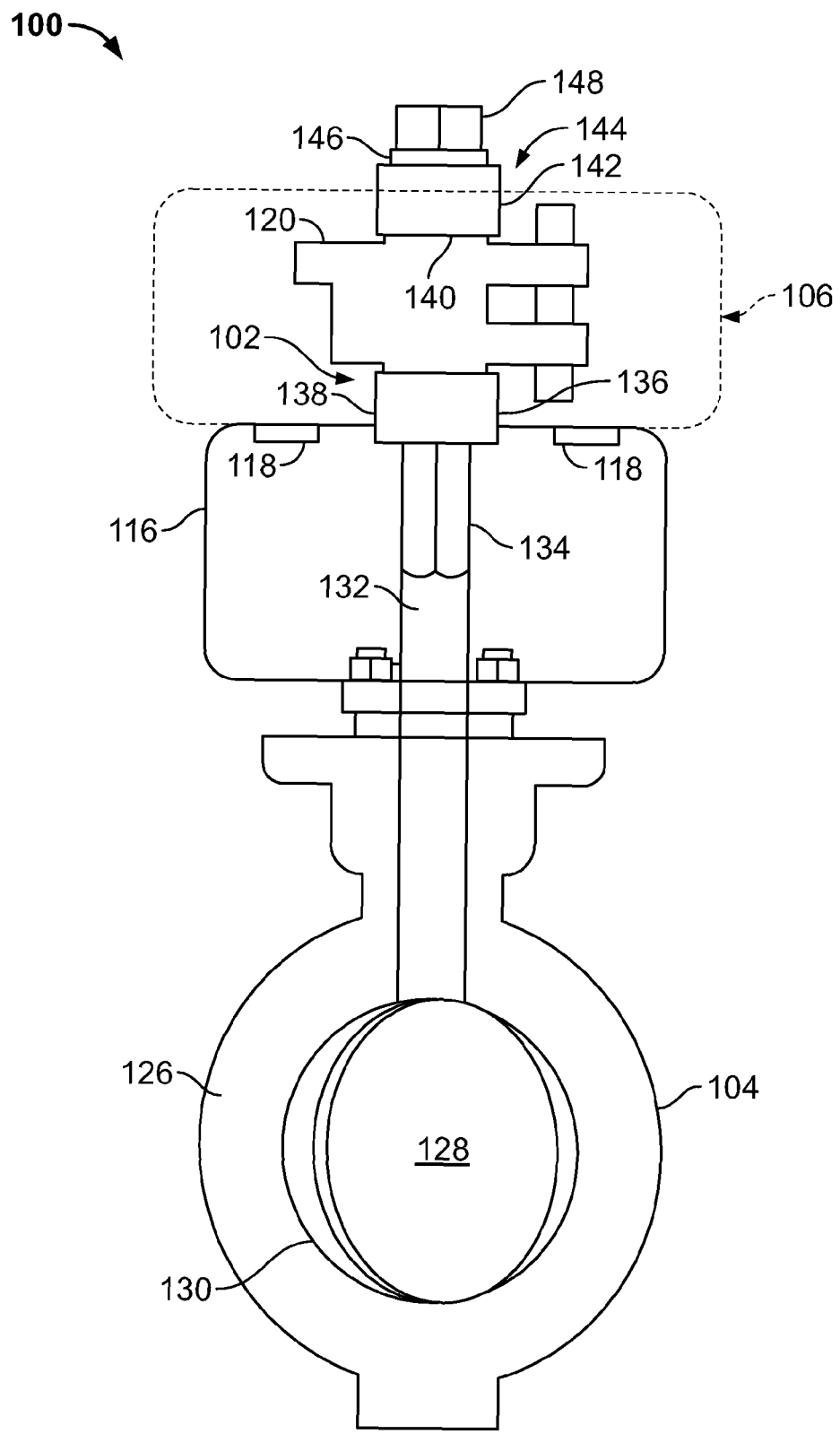
FIG. 1B illustrates a rotary valve that may be used to implement the rotary control valve assembly of FIG. 1A.

FIG. 1A illustrates an example rotary control valve assembly 100 having an example coupling assembly 102 described herein. FIG. 1B illustrates a rotary valve 104 that may be used to implement the rotary control valve assembly 100 of FIG. 1A. In general, the example valve assembly 100 includes an actuator 106 operatively coupled to the rotary valve 104 via the coupling assembly 102. The actuator 106 is configured to actuate (i.e., rotate, turn, etc.) to open/close the rotary valve 104 to control the flow fluid through the valve 104.

Referring to FIG. 1A, the actuator 106 (e.g., a diaphragm actuator, a piston actuator, etc.) is coupled to a housing 108 of the rotary control valve 100. The housing 108 includes a first faceplate 112 and a second faceplate (not shown) opposite the first faceplate 112 (i.e., the backside of the actuator 106). The first faceplate 112 and the second faceplate are substantially similar or identical, which enables a field configurable fail-safe operation of the actuator 106. The first face plate 112 includes a plurality of mounting holes 114 for mounting the rotary valve 104 to the actuator 106. A mounting bracket 116 (FIG. 1B) mounts the rotary valve 104 to the faceplate 112 via fasteners 118 (FIG. 1B) or any other suitable fastening mechanism that passes into and/or through the mounting holes 114.

As illustrated in FIG. 1A, the first faceplate 112 is removed from the actuator 106 to expose the coupling assembly 102. The coupling assembly 102 includes an example lever 120 that couples to or engages an example collet 122. The assembly of the lever 120 and the collet 122 is described in greater detail below. The collet 122 operatively couples the rotary valve 104 to the actuator 106. The actuator 106 includes an actuator stem (not shown) having a rod end bearing 124 that couples to the lever 120.

Referring to FIG. 1B, the rotary valve 104 includes a valve body 126 that houses a flow control member 128 and a seating surface or seal ring 130. The flow control member 128 engages the seal ring 130 to control the flow of fluid through the valve 104. The flow control member 128 is coupled to a valve shaft 132 which, in turn, is coupled to the lever 120 via the collet 122. The valve shaft 132 has a substantially square end 134 and may conform to an ISO standard for square shafts. However, the valve shaft 132 may be implemented using any other shape (e.g., any polygonal shape) and/or size. As described in greater detail below, the collet 122 is configured to apply a clamping force to the valve shaft 132 of the rotary valve 104 when the collet 122 is coupled to the lever 120.

As shown in FIG. 1B, a first end 136 of the lever 106 provides a first sleeve 138 that is configured to receive or engage the example collet 122 to form the coupling assembly 102. In a similar manner, a second end 140 of the lever 106 provides a second sleeve 142 through which the example collet 122 may be inserted to form a second coupling 144. The example collet 122 may be drawn into the lever 120 so that the first sleeve 138 or the second sleeve 142 engages the example collet 122. As described in greater detail below, the lever 120 engages a washer 146 and a fastener 148 draws the collet 122 within the lever 120 to cause the collet 122 to apply a clamping force to the valve shaft 132.

In operation, the rotary control valve assembly 100 receives a control signal such as, for example, compressed air, to displace the actuator 106. The displacement of the actuator 106 results in a corresponding linear displacement of the actuator stem. The linear displacement of the actuator stem is converted into a rotational displacement of the lever 120, whereby the lever 120 imparts a rotational force to the valve shaft 132 via the collet 122. For example, as the lever 120 rotates, the collet 122 rotates the valve shaft 132 to cause the flow control member 128 to rotate to a desired angular position to vary or control the fluid flowing through the rotary valve 104. When the flow control member 128 is closed, the flow control member 128 engages the seal ring 130 that encircles the flow path through the rotary valve 104 to prevent the flow of fluid through the valve 104.

Throttling the flow control member 128 may involve adjusting and controlling the position of the flow control member 128 between a fully open position and a fully closed position to achieve a desired process fluid flow and/or pressure. In addition, throttling the flow control member 128 may be performed in connection with a feedback system (not shown) that is configured to continually measure the flow and/or pressure of a process fluid. The feedback system may then cause, for example, the actuator 106 to at least partially actuate the lever 120 in response to changes in the flow and/or pressure of the process fluid. In throttling applications, minimizing or reducing lost motion between the lever 120 and the valve shaft 132 is important to achieving precise positioning of the flow control member 128. Such lost motion typically causes the actual position of a flow control member to deviate from a desired position. Substantially reducing or preventing such lost motion from occurring provides more accurate and improved valve performance.

Figure 2A:
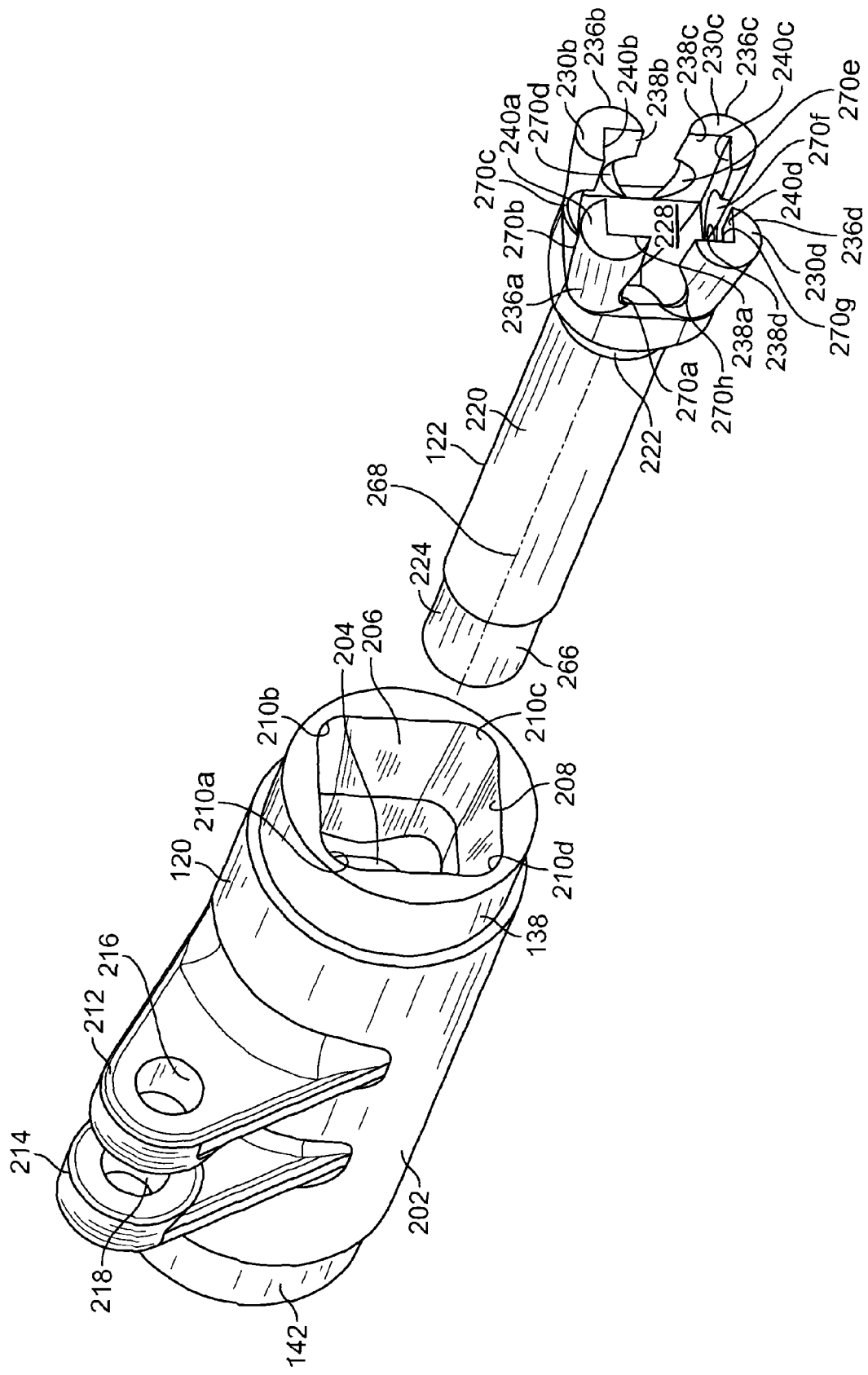
FIG. 2A illustrates the example collet and lever of FIGS. 1A and 1B.
Figure 2B:
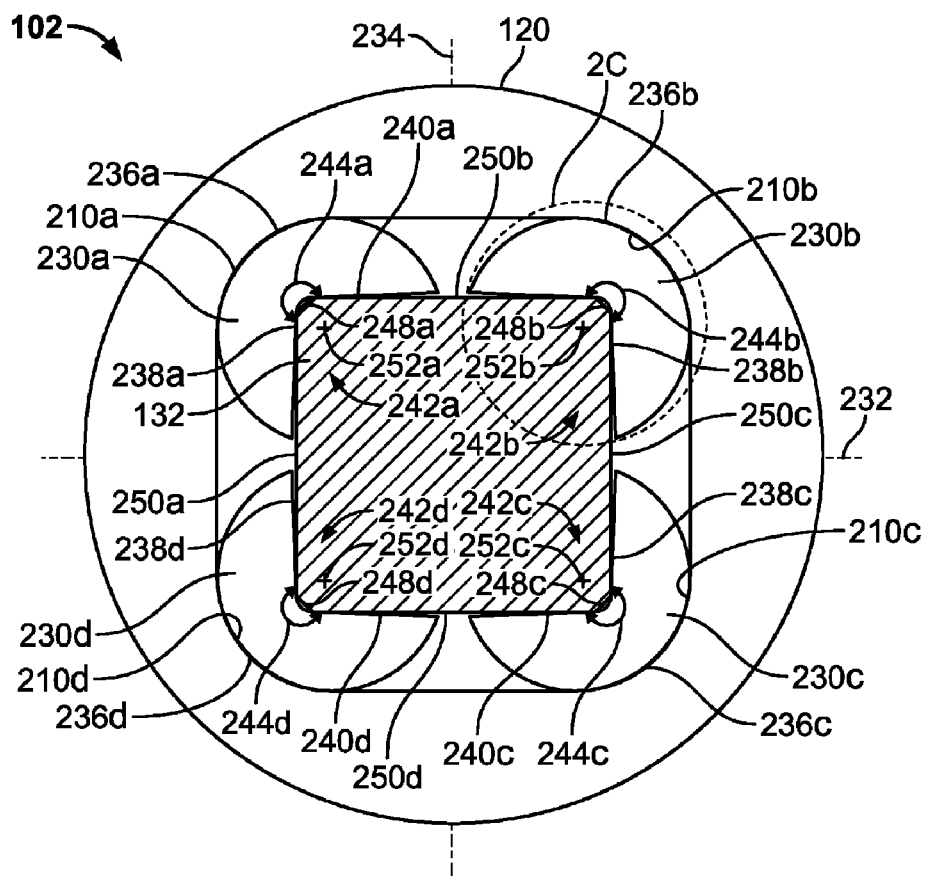
FIG. 2B illustrates an end view of the example collet of FIG. 2A
Figure 2C:
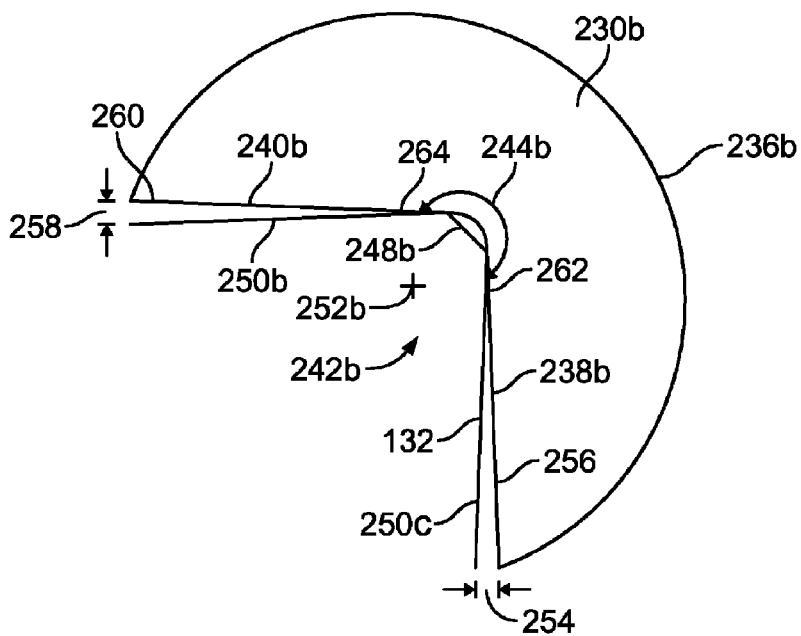
FIG. 2C illustrates an enlarged portion of the example collet of FIGS. 1A, 2A, and 2B.
Figure 2D:
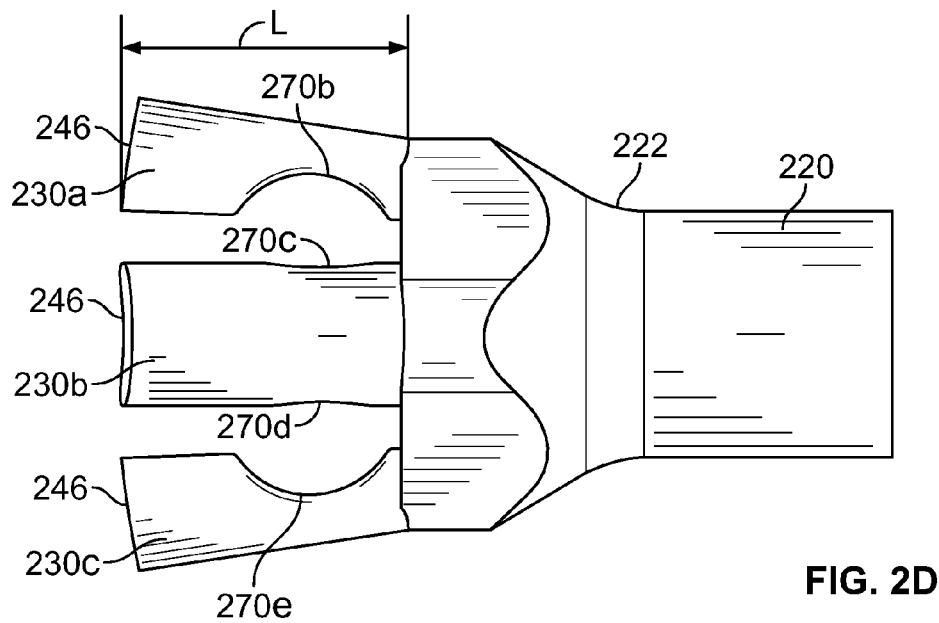
FIG. 2D illustrates a side view of the example collet of FIGS. 1A, and 2A-2C.

FIG. 2A illustrates the example lever 120 and the example collet 122 shown in FIG. 1A. FIG. 2B illustrates an end view of the example collet 122 coupled to the example lever 120 and the valve shaft 132 of FIGS. 1A and 2A. FIG. 2C illustrates an enlarged portion of the example collet 122 of FIGS. 1A, 2A, and 2B. FIG. 2D illustrates a side view of the example collet 122 of FIGS. 1A, 2A, and 2B. As stated above, in an assembled configuration, the example lever 120 and the example collet 122 form a coupling such as, for example, shown in FIGS. 1A and 1B.

The lever 120 includes a body 202 having a first opening or aperture 204 substantially near the center of the body 202. The sleeve 138 includes a second opening 206 that is larger than the opening 204. The second opening 206 has an inner surface 208 and defining a rectangular or square cross-sectional shape that includes rounded or circular shaped corners 210a-d that configure the opening 206 to receive the collet 122. Additionally, the inner surface 208 tapers toward the first opening 204. In some examples, the second sleeve 142 of the lever 120 may also include a third opening (not shown) opposite the second opening 206 and having a rectangular or square cross-sectional shape that includes rounded or circular shaped corners and which tapers toward the first opening 204. In the illustrated example, the sleeves 138 and 142 are integrally formed with the lever 120. However, in other examples, the sleeves 138 and/or 142 may be received by or coupled to the lever 120 in any other suitable manner(s).

The lever 120 includes lever arms 212 and 214 that extend from the body 202. The arms 212 and 214 include apertures or mounting hole 216 and 218, respectively, to receive a fastener (not shown) to rotatably couple the lever 120 to the rod end bearing 124 (FIG. 1A) of the actuator stem. Additionally, the body 202 may include a cam (not shown) that operatively couples to a positioner (not shown), which provides feedback to control the valve 100 based on the position on the cam.

Referring also to FIGS. 2B and 2C, the collet 122 includes an elongated member 220 having a first end 222 and a second end 224. The first end 222 includes a coupling portion 226 having a first opening or substantially rectangular bore 228 configured to receive a rectangular valve shaft, such as, for example the valve shaft 132 of FIG. 1B. In the illustrated example, the coupling portion 226 is integrally formed with the elongated member 220 to form a substantially unitary piece or structure. However, in other examples, the coupling portion 226 couples to the elongated member 220 via any suitable fastening mechanism(s).

The coupling portion 226 includes a plurality of flexible members 230a-d. In the illustrated example, each of the plurality of flexible members 230a-d has a circular-sector cross-sectional shape or form a cylindrically-shaped sector. The flexible members 230a-d are flared, canted, tilted or angled (e.g., a six degree angle) relative to a first plane 232 (e.g., a substantially horizontal plane) and a second plane 234 (e.g., a substantially vertical plane) and relative to each other. The flexible members 230a-d include circular or arcuate-shaped outer surfaces 236a-d. The arcuate outer surfaces 236a-d are shaped to engage the rounded corners 210a-d of the inner surface 208 of the lever 120. In addition, the flexible members 230a-d are tapered to matably engage the tapered surface 208 of the second opening 206.

The flexible members 230a-d include respective first inner surfaces 238a-d adjacent second inner surfaces 240a-d that form or define respective seating surfaces 242a-d of the flexible members 230a-d. The first and second inner surfaces 238a-d and 240a-d at least partially define the rectangular bore 228 of the coupling portion 226. The first inner surfaces 238a-d are approximately perpendicular to the second inner surfaces 240a-d and form respective angle 244a-d. Additionally, the first inner surface 238a of the flexible member 230a is substantially parallel to the first inner surfaces 238b-d of the flexible members 230b-d and the second inner surface 240a of the flexible member 230a is substantially parallel to the second inner surfaces 240b-d of the flexible members 230b-d. The angles 244a-d of each of the flexible members 230a-d is greatest (e.g., 270 degrees) at a first end 246 (FIG. 2D) of the flexible members 230a-d and taper (e.g., the angles decrease) along the length L of the flexible members 230a-d because the flexible members 230a-d are tapered.

The seating surfaces 242a-d receive respective corners 248a-d of the valve shaft 132. In the illustrated example, at least a portion of the first inner surfaces 238a and 238d engage a first side or surface 250a of the rectangular shaft 132 and at least a portion of the second inner surfaces 240a and 240b engage a second side or surface 250b of the rectangular shaft 132 adjacent to the first surface 250a of the rectangular shaft 132. Likewise, at least a portion of the first inner surfaces 238b and 238c engage a third side or surface 250c of the valve shaft 132 and the second inner surfaces 240c and 240d engage a fourth side or surface 250d of the valve shaft 132. The arcuate outer surfaces 236a-d advantageously have centers of curvature 252a-d that extend or lie inside or within the respective corners 248a-d of the valve shaft 132 when the valve shaft 132 is received by the bore 228. For example, the center of curvature 252a of the arcuate outer surface 236a falls within the corner 248a of the rectangular shaft 132 between the portions in which the first and second inner surfaces 238a and 240a of the flexible member 230a engage the respective first and second surfaces 250a and 250b of the rectangular shaft 132. This enables the first and second inner surfaces 238a-d and 240a-d to apply a greater amount of clamping force to the corner 248a-d of the valve shaft 132, which is where the most effective torque transmission occurs between the collet 122 and the valve shaft 132 when the actuator 106 actuates to rotate the lever 120. Thus, because the arcuate outer surfaces 236a-d having their centers of curvature 252a-d falling inside the corners 248a-d of the valve shaft 132, the flexible members 230a-d provide a more effective clamping force when coupled to the valve shaft 132.

In some examples, the angles 244a-d between the first inner surfaces 238a-d and the second inner surfaces 240a-d may be slightly less than 270 degrees such as, for example, 268 degrees, at the first end 246 of the flexible members 230a-d. In this manner, the first and second inner surfaces 238a-d and 240a-d can accommodate for manufacturing tolerances of the valve shaft 132. Additionally, a greater amount of clamping force can be concentrated near the corners 248a-d of the valve shaft 132. For example, as most clearly shown in FIG. 2C, the angle 244b between the first inner surface 238b and the second inner surface 240b of the flexible member 230b may be less than 270 degrees at the first end 246 so that a first gap 254 forms between a first portion 256 of the first inner surface 238b and the surface 250c valve shaft 132 and a second gap 258 forms between a first portion 260 of the second inner surface 240b and the valve shaft 132. In this manner, the gaps 254 and 258 enable the flexible member 230b to transmit a greater clamping force or load to the corner 248b of the valve shaft 132 as the collet 122 is drawn within the lever 120 by concentrating the clamping force near the corner 248b of the valve shaft 132.

Additionally, the configuration of the example collet 122 described herein substantially reduces or eliminates fretting, which causes the gripping engagement between the surfaces of the collet 122 and the valve shaft 132 to become loose. The surfaces 250a-d of the valve shaft 132 and the first and second inner surfaces 238a-d and 240a-d have microscopic surface asperities which, if not tightly gripped with a sufficiently, tight gripping or clamping force, may cause fretting to occur. Fretting occurs when asperities of the mating surfaces or the contact area between two materials under load are subject to relative motion by a force (e.g., the torque applied to the valve shaft 132 via the actuator 106) and causes the asperities at the mating surfaces to rub together and flake off, resulting in a loose connection between the collet 122 and the valve shaft 132.

Providing a greater clamping force prevents the asperities of the mating surfaces from rubbing by providing microscopic localized yielding to those local contact points or areas near the corners 248a-d during clamping when the collet 122 is drawn tight into the lever 120. The localized yielding provides local intimate engagement or conformity (i.e., a tighter grip) between the asperities or contact points of the mating surfaces of the valve shaft 132 and the bore 228 between the first and second inner surfaces 238a-d and 240a-d and the surfaces 250a-d of the valve shaft 132 as the collet 122 is drawn or pulled by the drawnut 148 into the lever 120. The greater clamping force prevents the asperities of the mating surfaces from rubbing and flaking off as the valve shaft 132 rotates between the open position and the closed position, thereby substantially preventing a loose connection between the valve shaft 132 and the collet 122. Additionally, gaps formed by having slightly smaller angles 242a-d between the first and second inner surfaces 238a-d and 240a-d may further reduce fretting. For example, referring to FIG. 2C, the gaps 254 and 258 enable a second portion 262 of the first surface 238b to engage the surface 250c of the valve shaft 132 and a second portion 264 of the second surface 240b to engage the surface 250b of the valve shaft 132 to concentrate the microscopic localized yielding to those local contact points or areas near the corner 248b during clamping when the collet 122 is drawn tight into the lever 120, which is where the most effective torque transmission occurs between the lever 120, the collet 122, and the valve shaft 132 when an actuator (e.g., the actuator 106) rotates the lever 120.

The example collet 122 may be drawn into the lever 120 using a drawing or pulling technique. As described above in connection with FIGS. 1A, and 1B, the washer 146 and the fastener (e.g., a drawnut) 148 may be used to draw or pull the example collet 122 toward and/or into the sleeve 138. For example, the elongated member 220 may have an externally threaded portion 266 at the second end 224 that may extend through the opening 204 of the lever 120 and the washer 146 to threadably engage the drawnut 148. In this manner, tightening the drawnut 148 pulls the example collet 122 into the lever 120 and, as a result, the inner surface 208 of the second opening 206 matably engages the outer surfaces 236a-d to cause the flexible members 230a-d to move inwardly to engage a valve shaft (e.g., the valve shaft 132) received by the bore 228 as described below. In an alternative configuration, the elongated member 220 may include inner threads (not shown) and a draw bolt (instead of the drawnut 148) that may engage the inner threads to draw the example collet 122 into the lever 120.

As the collet 122 is drawn into the lever 120, the tapered surface 208 of the second opening 206 engages the outer surfaces 236a-d to cause the flexible members 230a-d to be flexed or driven toward an axis 268 of the elongated member 220, which causes the flexible members 230a-d to flex to decrease the dimensions of the bore 228. In this manner, the example collet 122 may directly engage, for example, the valve shaft 132, thus reducing and/or eliminating any gaps between the first and second inner surfaces 238a-d and 240a-d of the bore 228 and the corner surfaces valve shaft 132. When the valve shaft 132 is positioned within the bore 228, the inner surfaces 230a-d directly engage and apply a clamping force to the surfaces 250a-d of the valve shaft 132 so that a substantially tight fit is achieved between the inner surfaces 238a-d and 240a-d and the surfaces 250a-d of the valve shaft 132.

Additionally or alternatively, the flexible members 230a-d are thinner as the flexible members 230a-d taper along the length L and toward the second end 224 of the elongated member 220. The thinner material facilitates the flexibility or displacement of the flexible members 230a-d toward the axis 268 of the collet 122 to further provide a greater clamping force to the valve shaft 132 when the collet 122 is drawn into the sleeve 138. Additionally, as most clearly shown in FIGS. 2A and 2D, the flexible members 230a-d may include arcuate-shaped apertures 270a-h to further facilitate the flexibility or displacement of the flexible members 230a-d toward the axis 268 of the collet 122 when the collet 122 is drawn into the sleeve 138.

Lost rotational motion (i.e., lost motion) between the lever 120 and the valve shaft 132 is substantially reduced or eliminated by eliminating the gaps between the surfaces 238a-d and 240a-d and the surfaces 250a-d of the valve shaft 132 via the example collet 122. Additionally, as the collet 122 is drawn or pulled by the drawnut 148 into the lever 120, the inner surface 208 of the sleeve 138 matably engages the outer surfaces 236a-d of the flexible members 230a-d to provide a tight coupling between the lever 120 and the collet 122 to further reduce or minimize lost motion between the lever 120 and the collet 122.

Over time and through the continuous operation of a valve (e.g., the valve 100 of FIGS. 1A and 1B), the surfaces of the valve shaft may wear. This may cause loosening of the initial coupling between a shaft and an actuator. However, with the example collets described herein such as, for example, the example collet 122, a substantially tight fit or coupling between an actuator (e.g., the actuator 106) and valve shaft (e.g., the shaft 132) may be maintained or easily restored by tightening the draw nut 148 or bolt to draw the example collet 122 further within the sleeve 138 of the lever 120 and further displace the flexible members 230a-d toward the shaft.

The example collet 122 and/or sleeve 138 may be formed via investment casting, or any other suitable process(es). Additionally, although the example collet 122 is shown as having four flexible members 230a-d, it is possible to implement the example collet 122 using fewer or more flexible members. For example, an example collet may be implemented using a single flexible member that applies a clamping force to one of the surfaces 250a-d of the valve shaft 132. In such a case, a first inner surface adjacent a second inner surface of the flexible member at least partially define a portion of a rectangular bore of a collet and having an arcuate outer surface having a center of curvature that lies inside a corner of a valve shaft to be received by the rectangular bore.

Figure 3B:
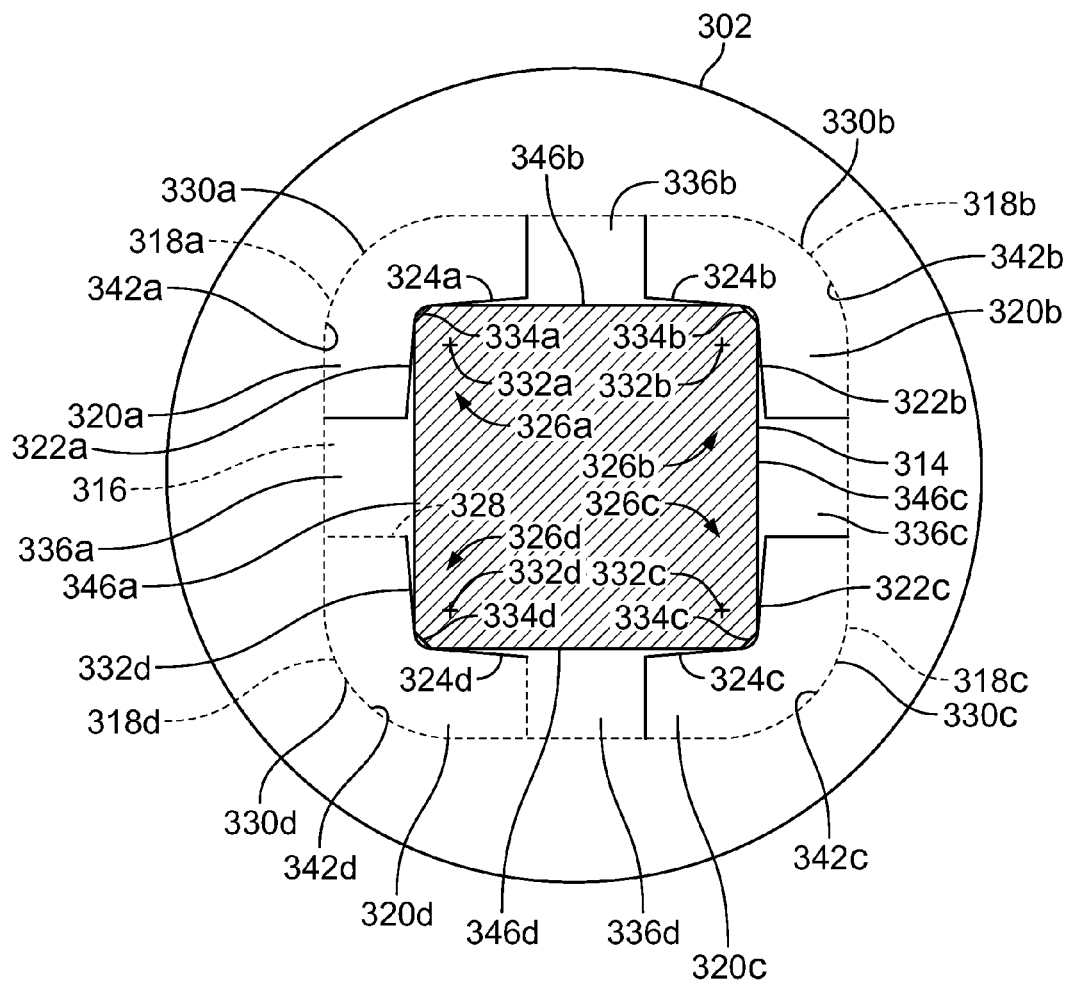
FIG. 3B illustrates an end view of the example collet and lever of FIG. 3A.
Figure 3A:
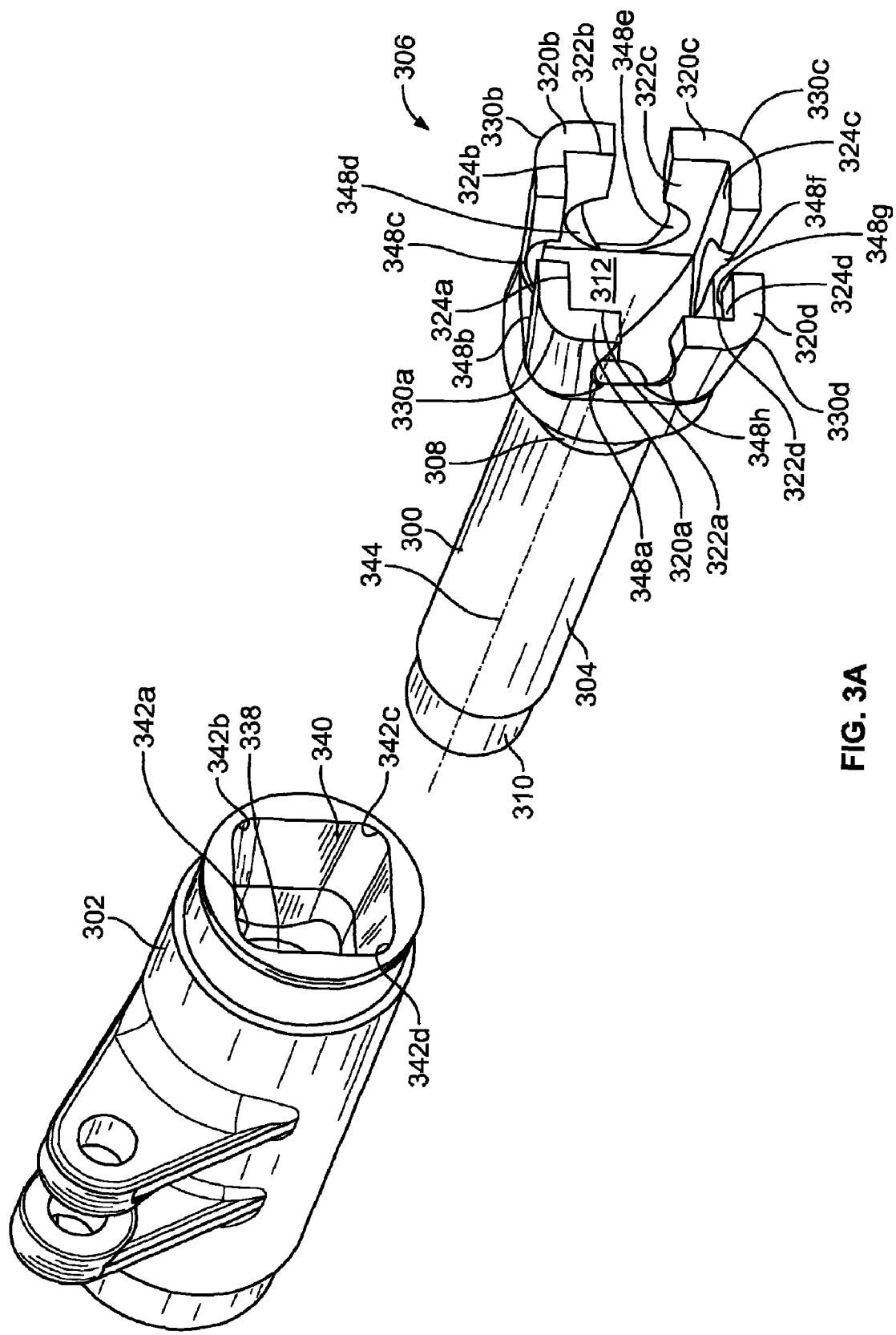
FIG. 3A illustrates another example collet and lever described herein.

FIG. 3A illustrates another example collet 300 and example lever 302 described herein. FIG. 3B illustrates an end view of the example collet 300 and lever 302 of FIG. 3A. The example collet 300 includes an elongated member 304 and a coupling portion 306. The elongated member 304 has a first end 308 and a second end 310. The coupling portion 306 is coupled to the first end 308 of the elongated member 304 and includes a first or substantially rectangular opening 312 configured to receive a rectangular valve shaft 314. The coupling portion 306 has a rectangular cross-sectional shape 316 having rounded corners 318a-d. In this manner, the example collet 300 provides a more compact profile than the example collet 122 of FIGS. 1A, 1B, and 2A-2D, and can receive relatively smaller valve shafts than the example collet 122. The lever 302 is also smaller than the lever 120 and may be advantageously used with relatively smaller control valves. The second end 310 of the elongated member 304 couples the collet 300 to the lever 302 and is configured to engage at least one of a nut or a bolt.

The coupling portion 306 includes a plurality of flexible members 320a-d that have respective first inner clamping surfaces 322a-d adjacent second inner clamping surfaces 324a-d. The first and second inner surfaces 322a-d and 324a-d define respective seating surfaces 326a-d that engage or receive the rectangular valve shaft 314. The flexible members 320a-d have an L-shaped cross-sectional shape 328 having curved outer surfaces 330a-d that define the rounded corners 318a-d of the coupling portion 306. The curved outer surfaces 330a-d have respective centers of curvature 332a-d that extend or lie inside respective corners 334a-d of the valve shaft 314. In this manner, an increased clamping force can be transmitted to the corners 334a-d of the valve shaft 314, which is where the most effective torque transmission occurs between the collet 300 and the valve shaft 314 when an actuator (e.g., the actuator 106 of FIG. 1A) actuates to rotate the lever 302. The flexible members 320a-d are tapered toward the second end 310 of the elongated member 304 and may be formed or separated by slits or openings 336a-d.

The example collet 300 is received by the lever 302 in substantially the same manner as the collet 122 is received by the lever 120, as described in connection with FIGS. 1A, 1B, 2A, and 2B. The lever 302 has a first opening 338 to receive the second end 310 of the elongated member 304 and a tapered second opening 340 to receive the coupling portion 306. The tapered second opening 340 has a rectangular cross-sectional shape having rounded corners 342a-d. The coupling portion 306 engages the second opening 340 of the lever 302 so that the arcuate outer surfaces 330a-d of the flexible members 320a-d engage the rounded corners 342a-d of the second opening 340. As the collet 300 is drawn into the lever 302, the tapered inner surface of the second opening 340 engages the tapered outer surfaces 330a-d to flex or displace the flexible members 320a-d toward an axis 344 of the collet 300. In this manner, when the collet 300 is drawn into the lever 302, the flexible members 320a-d are displaced toward and directly engage the valve shaft 314. In particular, when the second opening 340 receives the coupling portion 306 (i.e., the collet 300 is drawn into the lever 302), the first inner surfaces 322a and 322d engage a first surface 346a of the valve shaft 314 and the second inner surfaces 324a and 324b engage a second surface 346b of the valve shaft 314. Similarly, the first inner surfaces 322b and 322c engage a third surface 346c of the valve shaft 314 and the second inner surfaces 324c and 324d engage a fourth surface 346d of the valve shaft 314. The first and second inner surfaces 322a-d and 324a-d may directly engage the surfaces 346a-d of the valve shaft 314 to provide a clamping force to the valve shaft 314.

Additionally, the flexible members 320a-d may include openings or apertures 348a-h to enable the flexible members 320a-d to be more flexible. Such flexibility causes the flexible members 320a-d to be forced outwardly toward the mating inner surface 340 of the lever 302. In this manner, the flexible members 320a-d advantageously form independently acting wedges that engage the lever 302 to further minimize lost motion between the collet 300 and the lever 302. As discussed above, the example collet 300 advantageously provides a more compact collet 300 than the example collet 122 of FIGS. 1A, 2A, and 2B.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A shaft coupling assembly for use with rotary valves, comprising:
   an elongated member having a first end and a second end, wherein the first end includes a coupling portion having a first opening configured to receive a rectangular shaft, wherein the coupling portion includes at least one flexible member having an arcuate outer surface and a first inner surface adjacent a second inner surface that at least partially define the first opening, wherein at least a portion of the first inner surface is to engage a first side of the rectangular shaft and at least a portion of the second inner surface is to engage a second side of the rectangular shaft such that a center of curvature of the arcuate outer surface lies inside a corner of the rectangular shaft between the portions of the first inner surface and the second inner surface that engage the respective first and second sides of the rectangular shaft when the rectangular shaft is coupled to the shaft coupling assembly, and wherein the center of curvature is offset from the center of the shaft; and
   a sleeve having a second opening to receive the elongated member and a tapered third opening configured to receive the coupling portion.

2. A shaft coupling assembly as defined in claim 1, wherein the third opening comprises a rectangular cross-sectional shape having rounded corners.

3. A shaft coupling assembly as defined in claim 1, wherein the at least one flexible member tapers toward the second end of the elongated member.

4. A shaft coupling assembly as defined in claim 1, wherein the tapered third opening causes the at least one flexible member to be displaced toward a first axis of the elongated member to cause the first and second inner surfaces of the at least one flexible member to engage the rectangular shaft when the rectangular shaft is coupled to the shaft coupling assembly.

5. A shaft coupling assembly as defined in claim 1, further comprising at least another flexible member having a third inner surface adjacent a fourth inner surface that at least partially define the first opening and having a second arcuate outer surface, wherein at least a portion of the third inner surface is to engage a third side of the rectangular shaft and at least a portion of the fourth inner surface is to engage a fourth side of the rectangular shaft when the rectangular shaft is coupled to the shaft coupling assembly, and wherein a center of curvature of the second arcuate outer surface lies inside a second corner of the rectangular shaft when the rectangular shaft is coupled to the shaft coupling assembly.

6. A shaft coupling assembly as defined in claim 5, wherein the at least one flexible member and the at least another flexible member are configured to receive the rectangular shaft and to be displaced toward one another when the arcuate outer surfaces of the flexible members engage the third opening.

7. A shaft coupling assembly as defined in claim 1, wherein the second end of the elongated member is to couple the elongated member to the sleeve and is configured to engage at least one of a nut or a bolt.

8. A shaft coupling assembly as defined in claim 1, wherein the sleeve is integrally formed with a lever that is configured to be rotatably coupled to an actuator.

9. A shaft coupling assembly as defined in claim 1, wherein a transverse cross-sectional shape of the at least one flexible member comprises a sector of a circle.

10. A shaft coupling assembly as defined in claim 1, wherein the at least one flexible member comprises a substantially L-shaped transverse cross-sectional shape having a rounded outer portion to define the arcuate outer surface.

11. A collet for use with a rectangular shaft, the collet comprising:
a plurality of flexible members configured to be coupled to an elongated member and forming a substantially rectangular bore to receive a rectangular shaft, wherein the plurality of flexible members has seating surfaces that at least partially define the rectangular bore and arcuate outer surfaces that form a rectangular cross-sectional shape having curved corners that engage an inner surface of a rectangular opening of a lever, wherein at least one seating surface of a first flexible member of the plurality of flexible members is to receive a first side and a second side of the rectangular shaft such that a center of curvature of the arcuate outer surface of the first flexible member is to lie between portions of the first and second sides of the rectangular shaft engaged with the seating surface and such that the center of curvature does not coincide with a center of the rectangular shaft.

12. A collet as defined in claim 11, wherein the flexible members are angled relative to each other.

13. A collet as defined in claim 11, wherein the opening of the lever is configured to cause the plurality of flexible members to be displaced toward an axis of the elongated member to cause the seating surfaces of the plurality of flexible members to engage the rectangular shaft when the rectangular shaft is coupled to the collet.

14. A collet as defined in claim 11, wherein the plurality of flexible members is configured to be coupled to a lever associated with an actuator.

15. A collet as defined in claim 11, wherein each of the plurality of flexible members comprises a sector of a cylinder.

16. A collet as defined in claim 11, wherein each of the plurality of flexible member comprises a substantially L-shaped transverse cross-sectional shape having a rounded outer portion to define the arcuate outer surfaces.

17. A collet, comprising:
a coupling portion integrally formed with and extending from an elongated member and having an outer surface defining a rectangular cross-sectional shape having rounded corners and a first opening configured to receive a rectangular shaft, wherein the coupling portion comprises a plurality of flexible members, each of the flexible members having a first inner surface adjacent a second inner surface that at least partially define the first opening, and an arcuate outer surface that at least partially defines the rounded corners of the outer surface of the coupling portion wherein a center of curvature of each of the arcuate outer surfaces falls between a respective first inner surface and second inner surface of the flexible member that engage the rectangular shaft, and wherein the centers of curvature do not coincide with a center of the rectangular shaft.

18. A collet as described in claim 17, further comprising a lever to be operatively coupled to an actuator and having a second opening to receive the elongated member of the collet and a third opening having a tapered surface configured to engage the flexible members, wherein the third opening comprises a substantially rectangular cross-sectional shape having rounded corners.

19. A collet as defined in claim 18, wherein the flexible members are configured to slide within the third opening, and wherein the tapered surface of the third opening engages the arcuate outer surfaces of the flexible members to cause the first and second inner surfaces to deflect toward an axis of the elongated member.

20. A collet as defined in claim 18, wherein the flexible members are tapered.

* * * * *